Nov. 1, 1966 J. N. PEARSE 3,283,273

RELAY BINARY USING A RECIPROCATING MAGNET

Filed Oct. 20, 1965

2 Sheets-Sheet 1

INVENTOR
JAMES N. PEARSE

BY Thomas O. Kloehn

ATTORNEY

Nov. 1, 1966 J. N. PEARSE 3,283,273

RELAY BINARY USING A RECIPROCATING MAGNET

Filed Oct. 20, 1965 2 Sheets-Sheet 2

INVENTOR
JAMES N. PEARSE

BY Thomas O. Kloehn

ATTORNEY 3,283,273

RELAY BINARY USING A RECIPROCATING MAGNET

James N. Pearse, Menomonee Falls, Wis., assignor to Allen-Bradley Company, Milwaukee, Wis., a corporation of Wisconsin Filed Oct. 20, 1965, Ser. No. 498,529
6 Claims. (Cl. 335—152)

The present invention relates to a relay binary employing the combination of three magnetically operable switches; a reciprocable magnet that reciprocates in the direction of its magnet axis adjacent to said three magnetically operable switches; a first electromagnetic source which opposes the M.M.F. of said reciprocable magnet, acts upon said first magnetically operable switch and is connected for energization in series with the other two magnetically operable switches; a second electromagnetic source which opposes the M.M.F. of said reciprocable magnet, actuates said second magnetically operable switch and is connected for energization through said first magnetically operable switch; and a latching magnetic source which latches the first magnetically operable switch and which is of aiding polarity with respect to the riciprocable magnet; the third magnetically operable switch being actuated by the reciprocable magnet when the reciprocable magnet is closest to said magnetically operable switches.

A binary, sometimes called a flip-flop, may be defined as a bistable frequency divider, and thus generically defined, binaries have extensive and constantly growing application in performing digital functions in computers and control circuits. Relay binaries are so named because they use electromagnetically operated switches instead of electronic or semiconductor devices for controlling and providing an output. Although binaries usually respond to electrical input signals and provide electrical output signals, the present invention receives mechanical input signals and provides electrical output signals. In the past, the conversion from mechanical to electrical signals for this purpose has been accomplished by mechanically actuatable switches, and binaries of this type have been commonly employed in vending machines, warehousing control systems and other machine controls which must respond to a mechanical movement.

A primary advantage of the present invention lies in the fact it employs no mechanically actuated switches, but used only magnetically operated switches. This permits the use of sealed contact switches, which are of obvious value where the atmosphere in which the binary is to operate is corrosive, or where the contacts might otherwise be exposed to dirt, oils and other damaging substances from the surroundings. The value of the present invention in this respect is not confined, however, to specific environments, for the use of sealed contacts may greatly extend the life of the binary in ordinary atmosphere by isolating the contacts from the deteriorating effects of normal atmosphere. In addition to the advantages flowing from the use of sealed contacts, the present invention, as compared with other binaries of the same type, is compact, capable of high speed operation, economical, stable and rugged.

The present invention achieves those advantages by employing a movable magnet to actuate the magnetically operable switches. Preferably, a dry reed type of magnetically operable switch is used, which is made up of two, long, narrow, resilient, electrically conducted, magnetic metal blades, which are fixed at one end to serve as line terminals and are free at their other ends which overlap to form a working gap between them. These switches are normally open, but when they are exposed to a magnetic field of sufficient electromotive force, the magnetism induced in the reeds draws the reeds into contact with one another closing the working gap. Usually the working gap ends of the reeds are enclosed in a sealed glass envelope, which may be evacuated or filled with an inert gas as desired, to present completely isolated contacts and extraordinary high speed operation. Hence, by moving a permanent magnet of sufficient strength into proximity with such a reed switch, the reed switch may be closed. The present invention employs this device in conjunction with electrical circuitry to be described, to achieve a binary of superior properties.

In summary, the principal objects and advantages of the present invention may be listed as follows:

To provide a mechanically operated relay binary that is isolated from deteriorating or trouble causing environmental elements.

To provide a mechanically operated relay binary that is compact and that requires a minimum number of components.

To provide a mechanically operated relay binary that is capable of high speed operation.

To provide a mechanically operated relay binary that is stable, reliable, durable and rugged.

The foregoing and other objects and advantages will appear from the following description of the embodiments of the invention shown in the accompanying drawings which form a part of this disclosure. These embodiments are described in sufficient detail to enable those skilled in the art to practice this invention, but structural changes may be made in the embodiments described and other embodiments may be used in practicing the present invention. Hence, the following detailed description is not to be considered definitive of the scope of this invention, which instead is particularly pointed out and distinctly claimed in the claims to be found at the conclusion of this specification.

Figures 1, 2, 3, 4, 5, 6:
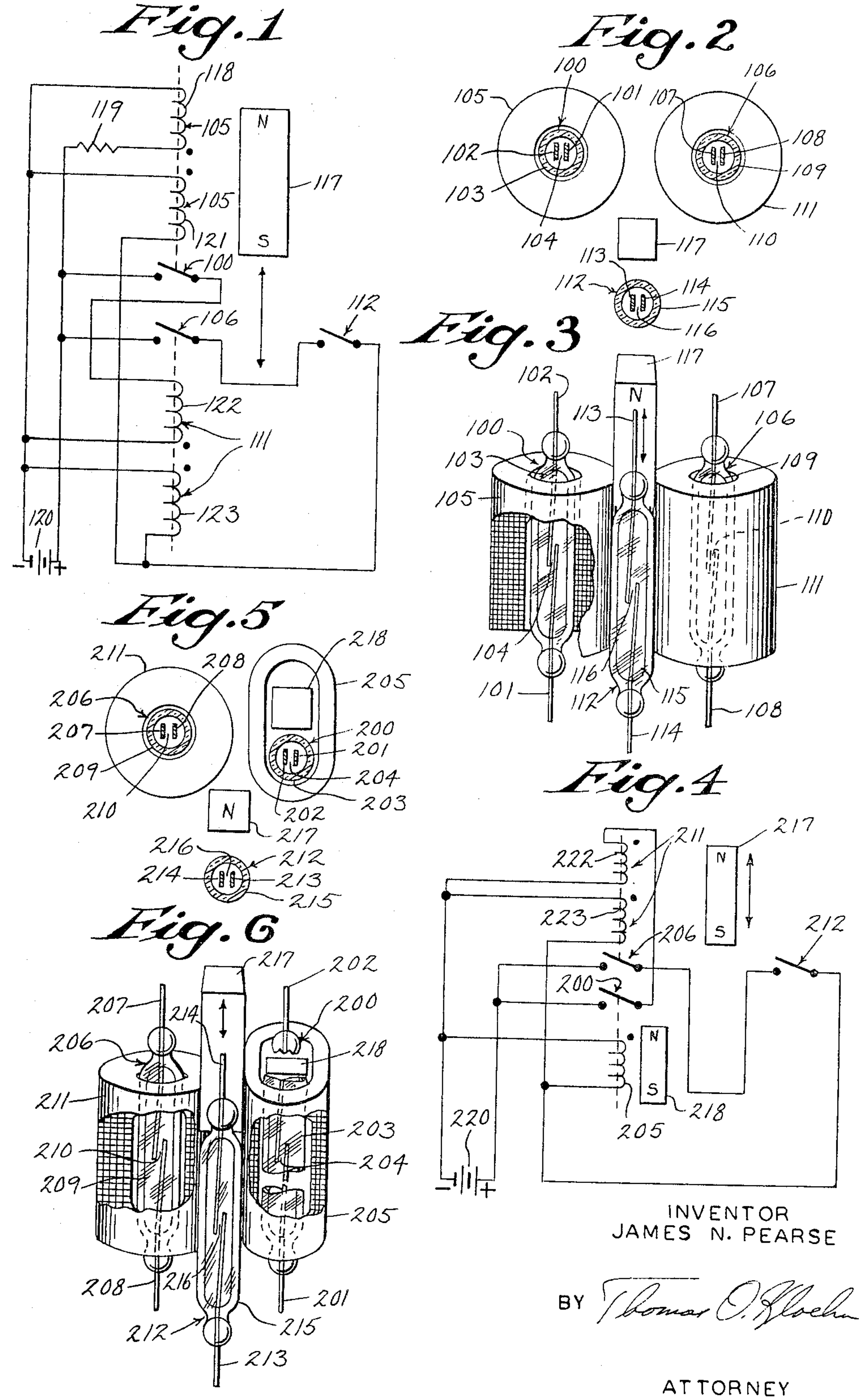
FIG. 1 is a schematic diagram of a first embodiment of the present invention.
FIG. 2 is a top plan view in section of the structure of the components employed in the embodiment of FIG. 1.
Figures 7, 8, 9:
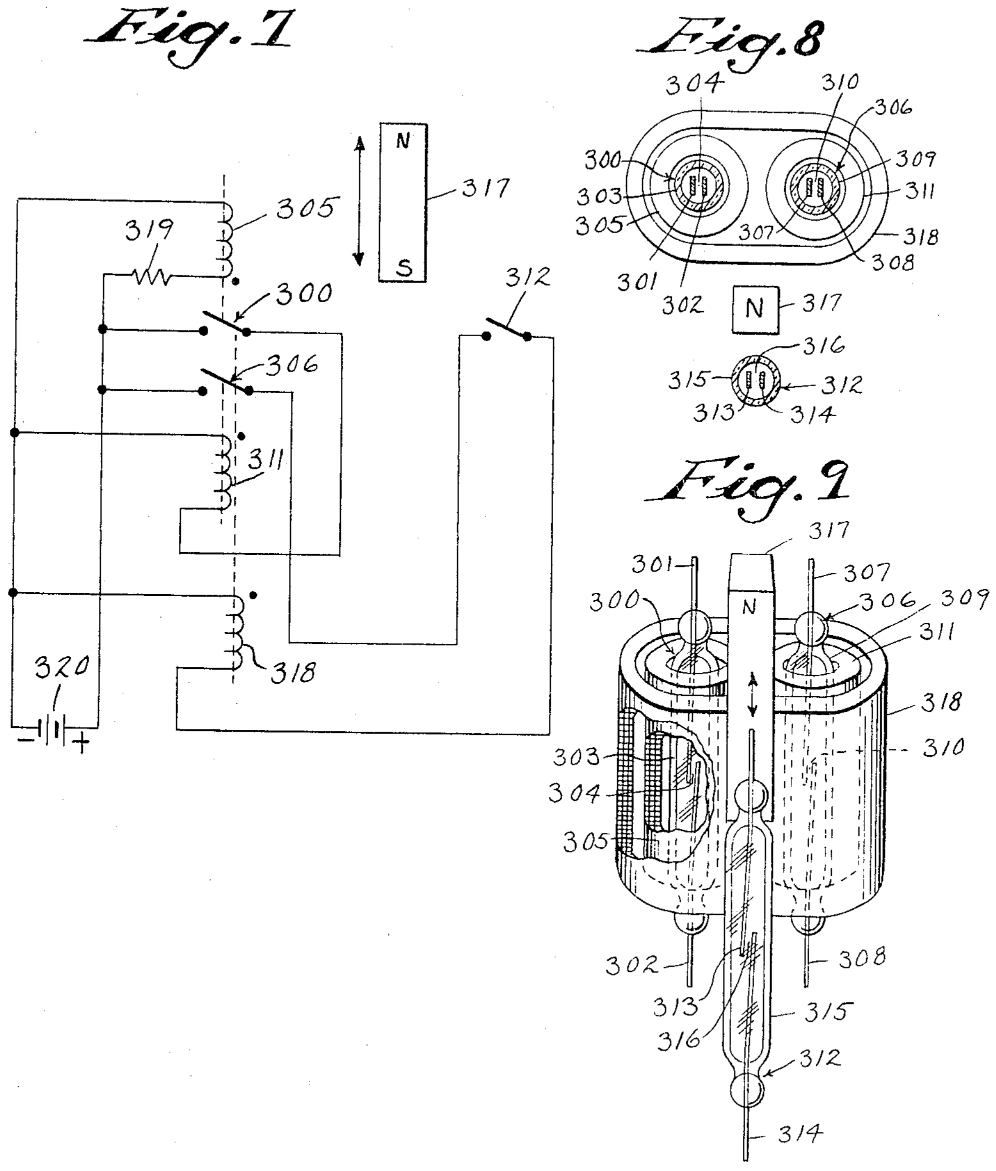

FIG. 3 is a view in perspective of the components employed in the embodiment shown in FIG. 1 with portions broken away to reveal inner structure, FIG. 4 is a schematic diagram of a second embodiment of the present invention, FIG. 5 is a top plan view in section of the components employed in the second embodiment of the present invention shown in FIG. 4, FIG. 6 is a view in perspective of the components employed in the embodiment shown in FIG. 4 with portions broken away to reveal inner structure, FIG. 7 is a schematic diagram of a third embodiment of th present invention, FIG. 8 is a top plan view in section of the components employed in the third embodiment of the present invention shown in FIG. 7, and FIG. 9 is a view in perspective of the components employed in the thrid embodiment of the present invention diagrammed in FIG. 7 with portions broken away to reveal inner structure.

Referring now specifically to FIGS. 2 and 3 of the drawings, these figures disclose a relay module for the first embodiment of the invention. A first reed switch 100 appearing on the left in the drawing, has two reed contacts 101 and 102, which are made of a resilient, electrically conductive and magnetic metal, mounted in the ends of a glass envelope 103 so that the free ends of the reeds 101 and 102 overlap one another within the glass envelope 103 and are biased to be normally open, defining a working gap 104 between them. The ends of the reeds 101 and 102 which project outwardly from the glass envelope 103 may be connected to the circuit conductors. The first reed switch 100 is mounted in the center of a first double winding coil 105, which is thus mounted in operative relationship to the first reed switch 100, so that if either of the windings of the coil 105 is energized by a current of sufficient strength the current turns produced will generate sufficient magnetomotive force to draw the reeds 101 and 102 in the switch 100 into contact with one another closing the working gap 104. Throughout the embodiments disclosed here dry reed switches of the same construction as the first reed switch 100 are employed as magnetically operable switches, but other types of magnetically operable switches are also available and may be used to practice this invention.

A second reed switch 106 appears on the right in the drawings and is of the same construction as the first reed 100. The second reed switch 106 has two reeds 107 and 108 mounted in the ends of a sealed glass envelope 109 defining a working gap 110 between them. The second reed switch 106 is mounted in the center of a second double winding coil 111 to be actuated when either of the windings are energized by sufficient electrical current. A third reed switch 112, also of the same construction as the other two, has no coil associated with it. Like the first two reed switches 100 and 106, the third reed switch 112 also has a pair of reeds 113 and 114 mounted in a glass envelope 115 to define a working gap 116 between them.

Finally, a permanent, reciprocable magnet 117 is mounted in a space between the third reed switch 112 and the first and second double winding coils 105 and 111 for reciprocating linear movement in a direction of its magnetic axis and parallel to the reed switches 100, 106 and 112. The stroke of the reciprocable magnet 117 is such that its lower extreme carries the magnet 117 to a point adjacent to the working gaps 104, 110 and 116 of the reed switches 100, 106 and 112, while at the top of the stroke the end of the reciprocable magnet 117 will be adjacent the top end of the glass envelopes 103, 109 and 115 so as to be remote from the working gaps 104, 110 and 116. The strength and location of the reciprocable magnet 117 is such that when it is at the bottom of its stroke it will actuate the third reed switch 112, forcing its reeds 113 and 114 into contact and closing the working gap 116 which normally separates them. However, the reciprocable magnet 117, being separated from the first reed switch 100 and the second reed switch 106 by the respective double winding coils 105 and 111, has its magnetomotive force too far attenuated by the reluctance of that space to actuate either the first reed switch 100 or the second reed switch 106, when acting alone.

Referring now to FIG. 1, it will be seen that one of the two windings of the first double winding coil 105 is a latching winding 118, which is connected through a current limiting resistor 119 across a direct current source in the form of the battery 120, so that the first winding 118 will be constantly energized. The current limiting resistor 119 functions to limit the current through the winding 118 to the extent that the current turns product (abbreviated "NI") generates insufficient magnetomotive force (abbreviated "M.M.F.") to actuate the first reed switch 100. The polarity dot in FIG. 1 indicates the polarity of the field generated by the windings relative to the field of the permanent magnet 117. In other words, a positive current entering a winding adjacent a polarity dot will generate a field of the same polarity as the reciprocable magnet 117. This convention is used throughout this specification.

A second winding 121 of the first double winding coil 105 is connected through the second reed switch 106 and the third reed switch 112, which reed switches 106 and 112 are connected in series, across the battery 120. Hence, if both the second and third reed switches 106 and 112, respectively, are closed the second winding 121 will be energized, and as the polarity dot indicates, the resulting field will oppose the field of the reciprocable magnet 117. In the second double winding coil 111, the first winding 122 is connected across the battery 120 in series with the first reed switch 100 so that if the first reed switch 100 is closed, the winding 122 will be energized to generate a field that will oppose the field of the permanent magnet 117. The second winding 123 of the second double winding coil 111 is connected in parallel with the second winding 121 of the first double winding coil 105 and in series with the series connected second and third reed switches 106 and 112 across the battery 120. When the second and third reed switches 106 and 112 are closed, the current passing through the second winding 123 of the second double winding coil 111 will generate a field, which, according to the polarity dot convention used here, will oppose the field of the reciprocable magnet 117.

It may be assumed for the purposes of this disclosure that all coil windings in all of the embodiments have the same number of turns. Hence, in this embodiment, as in others, the current to the latching winding 118 is reduced to reduce the NI of the winding. Obviously, the current could be constant and the turns reduced, or both current and turns could be reduced.

The binary of this embodiment is operated by the reciprocating permanent magnet 117 in the following manner: The leading edge of a mechanical input from an external source provides the impetus for driving the reciprocable magnet 117 downward from its position at the top of its stroke. At the end of the first down stroke of the reciprocable magnet 117, the M.M.F. of the reciprocable magnet 117 energizes the third reed switch 112 and it aids the M.M.F. of the latching winding 118 of the first double winding coil 105 so that the resultant M.M.F. is great enough to close the first reed switch 100. When the first reed switch 100 is closed the first winding 122 of the second double winding coil 111 is energized, but since its M.M.F. opposes the M.M.F. of the reciprocable magnet 117, the resultant M.M.F. is insufficient to actuate the second reed switch 105 so the second reed switch 106 remains in its normally open condition. The binary is in a stable state with the reciprocable magnet 117 at the bottom of its stroke and the first and third reed switches 100 and 112 closed.

The trailing edge of the first mechanical input returns the reciprocable magnet 117 to the top of its stroke. When the reciprocable magnet 117 is back at the top of its stroke, the third reed switch 112 returns to its normally open condition, but the first reed switch 100 will remain latched in the closed position by the M.M.F. generated by the latching winding 118 of the first double winding coil 105. The first reed switch 100 thus continues to connect the first winding 122 of the second double winding coil 111 across the battery 120. Since the reciprocable magnet 117 is now remote from the working gap 110 of the second reed switch 106 thus reducing its M.M.F. acting on the second reed switch 106 in opposition to the M.M.F. of the first winding 122 of the second double winding coil 111, the resultant M.M.F. acting on the second reed switch 106 will be sufficient to close it. The components should be selected to ensure that the third reed switch 112 opens before the second reed switch 106 closes. The binary is now in its third stable state with both the first and second reed switches 100 and 106 closed, the permanent magnet 117 at the top of its stroke and the third reed switch 112 open.

The leading edge of the second mechanical input drives the reciprocable magnet 117 back to the bottom of its stroke. When the permanent magnet 117 is at the bottom of its stroke, it actuates the third reed switch 112 to its closed position and opposes the M.M.F. of the first winding 122 of the second double winding coil 111. However, the M.M.F. of tne first winding 122 exceeds the M.M.F. of the reciprocable magnet 117, so the resultant M.M.F. holds the second reed switch 106 in its closed position. With both the second reed switch 106 and the third reed switch 112 closed, both the second winding 121 of the first double winding coil 105 and the second winding 123 of the second double winding coil 111 are energized. The M.M.F. of the second winding 121 of the first double winding coil 105 opposes the combined M.M.F.'s of the permanent magnet 117 and the latching winding 118, so that the resultant M.M.F. is too weak to hold the first reed switch 100 and it returns to its normally open condition. The M.M.F. of the second winding 123 aids the M.M.F. of the first winding 122 of the second double winding coil in opposing the M.M.F. of the reciprocable magnet 117, so the second reed switch 106 remains in its closed condition. Thus, the binary is now in its fourth stable state wherein the first reed switch 100 is in its normally open condition, the second and third reed switches 106 and 112, respectively, are closed, and the reciprocable magnet 117 is at the bottom of its stroke. Since the first reed switch 100 is open, the first winding 122 of the second double winding coil 111 is deenergized.

The trailing edge of the second mechanical input moves the reciprocable magnet 117 upward returning it to the top of its stroke. When the permanent magnet 117 is restored to the top of its stroke, the third reed switch 112 again opens, opening the circuit to the second winding 121 of the first double winding coil 105 and the second winding 123 of the second double winding coil 111. With the second winding 121 of the first double winding coil 105 deenergized, the first reed switch 100 remains open. Since both windings 122 and 123 of the second double winding coil 111 are deenergized, the second reed switch 106 also returns to its normally open condition. Thus, the binary is restored to its first stable state and one cycle of its operation is complete.

The operation of the binary may be summarized as follows: The third reed switch 112 is closed on each down-stroke of the permanent magnet 117 and opened on each up-stroke of the permanent magnet 117, the first reed switch 100 is alternately closed and opened by the down-strokes of the permanent magnet 117 and the second reed switch 106 is alternately closed and opened by the up-strokes of the permanent magnet 117. In other words, if an output is taken from the first reed switch 100, leading edge logic will be obtained, but if an output is taken from the second reed switch 106, trailing edge logic is obtained. In any event, the operation is asynchronous.

*Second embodiment*

FIGS. 5 and 6 illustrate a relay module for use in the second embodiment of the invention which is shown in FIG. 4. A first reed switch 200, which appears on the right in the drawing, is of the same construction as the reed switches described with the first embodiment, having a pair of reeds 201 and 202 mounted in the ends of a sealed glass envelope 203 so that the ends of the reeds 201 and 202 are normally biased apart to define a working gap 204 between them. The first reed switch 200 is mounted in the center of a single winding coil 205. A second reed switch 206 of the same construction also has a pair of reeds 207 and 208 mounted in the ends of a sealed glass envelope 209 so that their inward projecting ends define a working gap 210 between them, and appears on the left in the drawings. However, the second reed switch 206 is mounted inside a double winding coil 211. A third reed switch 212, like the others, has a pair of reeds 213 and 214 mounted in the ends of a sealed glass envelope 215 so that their inward projecting ends define a working gap 216 between them.

A reciprocable permanent magnet 217 is mounted for limited reciprocating strokes in a direction of its magnetic axis parallel to the reed switches 200, 206 and 202, respectively, in a space between the three switches 200, 206 and 212. The strength of the reciprocable magnet 217 and its proximity to the third reed switch 212 are such that the M.M.F. exerted upon the third reed switch 212 by it at the bottom end of its stroke adjacent the working gap 216 of the third reed switch 212 is sufficient to close the third reed switch 212. However, the reciprocable magnet 217, even at the bottom of its stroke, is spaced sufficiently far from the first and second reed switches 200 and 206, that its attenuated M.M.F. acting upon those switches 200 and 206 is insufficient to close either of them. As was the case in the previous embodiment, when the reciprocable magnet 217 is at the top of its stroke, it is remote from the working gaps 204, 210 and 216 and adjacent the top ends of the envelopes 203, 209 and 215.

In addition to the single winding coil 205 acting upon the first reed switch 200, there is also a permanent latching magnet 218 which is mounted adjacent to the first reed switch 200 inside the single winding coil 205. The M.M.F. of the permanent latching magnet is insufficient, when acting alone, to close the first reed switch 200, but it is oriented to have the same polarity as the reciprocable magnet 217 so that when the reciprocable magnet 217 is at the bottom of its stroke the M.M.F.'s of the two permanent magnets 217 and 218 will add to a resultant sufficient to close the first reed switch 200 in the absence of any opposing forces.

Turning now to FIG. 4, the single winding coil 205 is connected to be energized through the series connected second and third reed switches 206 an 212, respectively, by a direct current cource presented by the battery 220. As is apparent from the representation of the battery 220 in the drawings, its positive plate is connected through the switches 206 and 212 to the end of the coil 205 remote from the polarity dot, so that the M.M.F. generated by the coil will oppose the M.M.F.'s of both the permanent latching magnet 218 and the reciprocable magnet 217. The double winding coil 211 has windings 222 and 223. The first winding 222 is connected to be energized through the first reed switch 200 so that the M.M.F. generated by the winding 222 will oppose the M.M.F. of the reciprocable magnet 217. The second winding 223 of the double winding coil 211 is connected in parallel with the single winding coil 205 to be energized through the series connected second and third reed switches 206 and 212, respectively, so that when energized, it too will generate an M.M.F. opposing the M.M.F. of the reciprocable magnet 217.

The operation of the second embodiment is largely the same as that of the first embodiment, except that the permanent latching magnet 218 in the second embodiment replaces the latching winding 118 of the first double winding coil 105 in the first embodiment.

The initial condition of the binary of the second embodiment has the reciprocable permanent magnet 217 at the top of its stroke and all reed switches 200, 206 and 212 open. The leading edge of the first mechanical input drives the reciprocable magnet 217 to the bottom of its stroke. At the bottom of its downward stroke, the reciprocable magnet 217 closes the third reed switch 212 and adds its M.M.F. to the M.M.F. of the permanent latching magnet 218 creating a resultant M.M.F. sufficient to close the first reed switch 200. When the first reed switch 200 closes, the first winding 222 of the double winding coil 211 is energized, but since the M.M.F. thus generated is opposed by the M.M.F. of the reciprocable magnet 217, the resultant M.M.F. is insufficient to cause any change in the condition of the second reed switch 206. The binary is now in its second stable state, with the reciprocable magnet 217 at the bottom of its stroke and the first and third reed switches 200, 212 closed.

The trailing edge of the first mechanical input signal moves the reciprocable magnet 217 upward to the top of its stroke, permitting the third reed switch 212 to return to its normally open condition. The first reed switch 200 remains latched in its closed condition by the permanent latching magnet 218. Since the reciprocable magnet 217 is too remote from working gap 210 of the second reed switch 206 to effectively influence the switch 206, the M.M.F. generated by the first winding 222 of the double winding coil 211 is sufficient to close the second reed switch 206. When the second reed switch 206 closes, the binary is in its third stable state inasmuch as no further changes can take place until the third reed switch 212 is again closed, with the reciprocable magnet 217 at the top of its stroke and the first and second reed switches 200 and 206 closed.

The leading edge of the second mechanical input drives the reciprocable magnet 217 back to the bottom end of its stroke, where it closes the third reed switch 212. With all three reed switches 200, 206 and 212 closed, the single winding coil 205 and the parallel connected second winding 223 of the double winding coil 211, and the first winding 222 of the double winding coil 211 are energized by the direct current source 220 so as to generate M.M.F.'s opposing the M.M.F. of the reciprocable magnet 217 and the permanent latching magnet 218. The energization of the single winding coil 205 has the effect of cancelling the field of the permanent latching magnet 218 and the reciprocable permanent magnet 217 so that the resultant M.M.F. is too weak to latch the first reed switch 200 and it opens. The opening of the first reed switch 200 deenergizes the first winding 222 of the double winding coil 211, but since the second winding 223 of the double winding coil 211 is simultaneously energized, the second reed switch 206 remains closed along with the third reed switch 212. The binary is now in its fourth stable condition, with the reciprocable magnet 217 at the bottom of its stroke and the second and third reed switches 206 and 212 closed.

The trailing edge of the second mechanical input moves back up to the top of its stroke and the third reed switch 212 opens deenergizing the single winding coil 205 and the second winding 223 of the double winding coil 211. With these coils deactivated, there is no M.M.F. effectively acting upon the second reed switch 206, so it also returns to its normally open condition and the only field acting upon the first reed switch 200 is that of the permanent latching magnet 218 which is insufficient to close it. Hence, the binary is restored to its first initial condition and one cycle of its operation is complete.

Inasmuch as the sequence of operation of the second embodiment is the same as that of the first embodiment, the summarization of the sequence will not be repeated here.

*Third embodiment*

FIGS. 8 and 9 are diagrams of a relay module for making the third embodiment shown in FIG. 7. A first reed switch 300 of the same construction as the reed switches described in the first embodiment, appears on the left in the drawings, and it has two reeds 301 and 302 mounted in the ends of a glass envelope 303 so that the reeds 301 and 302 define a working gap 304 between them. The first reed switch 300 is mounted in the center of a single winding coil 305. A second reed switch 306 also of the same construction has a pair of reeds 307 and 308 mounted in the ends of a glass envelope 309 to define a working gap 310 between them. The second reed switch 306 is mounted in the center of a second single winding coil 311, and appears on the right in the drawings. A similarly constructed third reed switch 312 also has a pair of reeds 313 and 314 mounted in opposite ends of a glass envelope 315 to define a working gap 316 between them, but it has no coil associated with it. A reciprocable permanent magnet 317 is mounted parallel to and in a space between the three reed switches 300, 306 and 312 to be moved in reciprocating strokes parallel to the reed switches 300, 306 and 302 in the direction of its magnetic axis. At the bottom of its stroke, the reciprocable magnet 317 is adjacent the working gaps 304, 310 and 316 or the reed switches 300, 306 and 312, and at the top of its stroke it is remote from the working gaps 304, 310 and 316, and adjacent the top ends of the glass envelopes 303, 309 and 315. A third single winding coil 318 is wrapped about and surrounds both the first and second single winding coils 305 and 311, which individually contain the first and second reed switches 300 and 306. Thus it is evident that the M.M.F. generated by first single winding coil 305 acts on the first reed switch 300, the M.M.F. generated by second single winding coil 311 acts on the second reed switch 306, and the M.M.F. generated by third single winding coil 318 acts on both the first and second reed switches 300 and 306, whereas only the reciprocable permanent magnet 317 acts on the third reed switch 312.

FIG. 7 shows how the module of FIGS. 8 and 9 can be connected in the third embodiment of the present invention. A direct current source in the form of a battery 320 is provided to energize the coils 305, 311 and 318. The first single winding coil 305 is connected directly across the battery 320 through the current limiting resistor 319 so that the M.M.F. generated by the coil 305 will aid the M.M.F. of the reciprocable magnet 317. The current limiting resistor 319 serves to reduce the NI of the coil 305 so that the M.M.F. it generates will be sufficient to latch the first reed switch 300, but insufficient to close it. The second single winding coil is connected in series with the first reed switch 300 across the battery 320 so that when the first reed switch 300 is closed, the second single winding coil 305 will generate an M.M.F. opposing that of the reciprocable magnet 317. The third single winding coil 318 is connected across the battery 320 in series with both the second and third reed switches 306 and 312, respectively, so that when both of the reed switches 306 and 312 are closed, the M.M.F. generated by the third single winding coil 318 will oppose the M.M.F. of the reciprocable permanent magnet 317.

The initial condition in the operation of the third embodiment is as shown in the drawings, the reciprocable magnet 317 being at the top of its stroke and all three reed switches 300, 306 and 312 being in the normally open state. The leading edge of the first mechanical input drives the reciprocable magnet 317 to the bottom of its stroke, where its M.M.F. closes the third reed switch 312 and aids the M.M.F. of the first single winding coil 305 to effect a resultant M.M.F. which closes the first reed switch 300. With the first reed switch 300 closed, the second single winding coil 311 is energized and its M.M.F. would close the second reed switch but for the opposition of the M.M.F. of the reciprocable magnet 317. Hence, the binary has reached a second stable condition wherein the reciprocable magnet 317 is at the bottom of its stroke and the first and third reed switches 300 and 312 are closed.

The trailing edge of the first mechanical input restores the reciprocable magnet 317 to the top of its stroke. When the reciprocable magnet 317 is at the top of its stroke, the third reed switch 312 is always open. Now the first reed switch 300 remains latched in its closed position by the first single winding coil 305, and in the absence of the opposing M.M.F. of the reciprocable magnet 317, the M.M.F. of the energized second single winding coil 311 closes the second reed switch 306. However, since the second reed switch 306 is in series with the third reed switch 312, no further changes in the condition of the binary can occur. In this third stable state, the reciprocable magnet 317 is at the top of its stroke and the first and second reed switches 300 and 306 are closed.

The leading edge of the second mechanical input drives the recopricable magnet 317 back to the bottom of its stroke. When the reciprocable magnet 317 is at the bottom of its stroke, it always closes the third reed switch 312. With the third reed switch 312 closed, the third single winding coil 318 common to both the first and second reed switches 300 and 306 is energized to generate M.M.F. opposing the M.M.F.'s of the reciprocable magnet 317 and the first single winding coil 305. Since the resultant M.M.F. of the first and third coils 305 and 318 and the reciprocable magnet 317 is insufficient to latch the first reed switch 300, it returns to its normally open state. The opening of the first reed switch 300 deenergizes the second single winding coil 311, but the resultant M.M.F. of the third single winding coil 318 and the reciprocable magnet 317 latches the second reed switch closed. The binary is now in its fourth stable state with the reciprocable magnet 317 at the bottom of its stroke and the second and third reed switches 306 and 312 closed.

The trailing edge of the second mechanical input moves the reciprocable magnet 317 to the top of its stroke, allowing the third reed switch 312 to open and deenergize the third single winding coil 318 so the second reed switch 306 also opens. With the binary thus restored to its initial condition one cycle of operation is completed. An output taken off the first reed switch 300 would give asynchronous leading edge logic, and an output taken off the second reed switch would give asynchronous trailing edge logic.

Only three of a multitude of possible embodiments of the present invention have been thoroughly described here. Hence, the embodiments described are not to be considered exhaustive of the embodiment and variations in which the invention may be practiced. The subject matter of the invention, as distinguished from its embodiments, is set forth in the claims that follow.

I claim:

1. A relay binary comprising the combination of
a current source;
at least three normally open magnetically operable switches each having at least a pair of magnetic members defining a working gap between them, a first of said switches being connected to said current source, and a second and third of said switches being connected in series with said current source;
a reciprocable magnet mounted for movement in linear reciprocating strokes in the direction of its magnetic axis relative to said magnetically operable switches such that at one end of each stroke said reciprocable magnet is remote from said working gaps and at the other end of each stroke said reciprocable magnet is adjacent to said working gaps;
a first electromagnetic source having opposite polarity from said reciprocable magnet being adapted to actuate the first of said magnetically operable switches and being connected to be energized by said current source through the second and third magnetically operable switches;
a second electromagnetic source having opposite polarity from said reciprocable magnet, being adapted to actuate the second of said magnetically operable switches and being connected to be energized by said current source through said first magnetically operable switch;
a latching magnetic source having the same polarity as said reciprocable magnet, being adapted to latch said first magnetically operable switch but having insufficient magnetomotive force to actuate said first magnetically operable switch;

and the third magnetically operable switch adapted to be actuated by said reciprocable magnet when said reciprocable magnet is adjacent to said working gap defined by its magnetic members.

2. A relay binary according to claim 1 wherein
said first electromagnetic source is one winding of a coil mounted in operative relationship to said first magnetically operable switch;
said second electromagnetic source is a coil mounted in operative relationship to said second magnetically operable switch and having one winding connected to be energized through said second and third magnetically operable switches;
and said latching magnetic source is another winding of said coil mounted in operative relationship to said first magnetically operable switch and connected to energized through a current limiting resistance.

3. A relay binary according to claim 1 wherein
said second electromagnetic source is a coil mounted in operative relationship to said second magnetically operable switch having one winding connected to be energized through said first magnetically operable switch and another winding connected to be energized through said second and third magnetically operable switches;
and said latching magnetic source is a permanent magnet.

4. A relay binary according to claim 1 wherein
said first electromagnetic source is a coil mounted in operative relationship to both said first and said second magnetically operable switches;
and said second electromagnetic source is a coil mounted in operative relationship to said second magnetically operable switch.

5. A relay binary according to claim 1 wherein
said first electromagnetic source is a coil mounted in operative relationship to both said first and said second magnetically operable switches;
said second electromagnetic source is a coil mounted in operative relationship to said second magnetically operable switch;
and said latching magnetic source is a coil connected to be energized through a current limiting resistance.

6. A relay binary as set forth in claim 1 wherein
said magnetically operable switches are reed switches each having a sealed tubular glass envelope and a pair of resilient and electrically conductive and magnetic reeds mounted in opposite ends of said glass envelope to project inwardly with normally spaced apart overlapping ends defining said working gap between them;
said reciprocable magnet is a permanent magnet mounted to move parallel to said reed switches in a space between them;
said first electromagnetic source is a coil mounted around a first of said reed switches;
and said second electromagnetic source is a coil mounted around a second of said reed switches.

References Cited by the Examiner

UNITED STATES PATENTS

| | | | |
|---|---|---|---|
| 2,995,637 | 8/1961 | Feiner et al. | 200—87 |
| 3,134,908 | 5/1964 | Ellwood | 200—87 X |

BERNARD A. GILHEANY, *Primary Examiner.*

JOSEPH J. BAKER, *Assistant Examiner.*